(12) United States Patent
Ueki et al.

(10) Patent No.: US 6,712,887 B2
(45) Date of Patent: Mar. 30, 2004

(54) GAS ADSORBENT FILTER (75) Inventors: Takuya Ueki, Okayama (JP); Yutaka Sasaki, Okayama (JP)

(73) Assignee: Japan Gore-Tex, Inc., Tokyo (JP)

( * ) Notice: Subject to any disclaimer, the term of this patent is extended or adjusted under 35 U.S.C. 154(b) by 0 days.

(21) Appl. No.: 10/236,456

(22) Filed: Sep. 6, 2002

(65) Prior Publication Data

US 2003/0047078 A1 Mar. 13, 2003

(51) Int. Cl.[7] .............................................. B01D 53/04
(52) U.S. Cl. ......................... 96/134; 96/139; 55/385.4; 55/385.6; 360/97.02
(58) Field of Search ....................... 96/134, 135, 139, 96/147, 152, 154; 55/385.1, 385.4, 385.6; 360/97.02, 97.03, 97.04

(56) References Cited

U.S. PATENT DOCUMENTS

| | | | | |
|---|---|---|---|---|
| 4,863,499 A | * | 9/1989 | Osendorf | 96/134 |
| 5,030,260 A | * | 7/1991 | Beck et al. | 96/139 |
| 5,447,695 A | * | 9/1995 | Brown et al. | 422/171 |
| 6,168,651 B1 | | 1/2001 | Tuma et al. | 95/90 |
| 6,214,070 B1 | * | 4/2001 | Crowder et al. | 55/320 |
| 6,475,269 B1 | * | 11/2002 | Turner | 96/134 |
| 6,475,270 B1 | * | 11/2002 | Graeve | 96/135 |

FOREIGN PATENT DOCUMENTS

| | | |
|---|---|---|
| JP | 4-323007 | 11/1992 |
| JP | 2000-70649 | 3/2000 |
| JP | 2000-107543 | 4/2000 |

\* cited by examiner

*Primary Examiner*—Frank M. Lawrence
(74) *Attorney, Agent, or Firm*—Carol A. Lewis White (57) ABSTRACT

A gas adsorption filter located over a breathing hole within a semi airtight container, wherein the gas adsorption filter has an opening that is connected with and open to the breather hole and, comprises a base material for attaching the filter to the inner wall of the container and a gas adsorption body that is laminated and fixed to the gas flow path surface of the base material, and on the gas contact surface on the side where the gas adsorption body is in contact with the gas flow path surface of the base material, there is at least one gas inflow orifice that is connected to the opening of the base material, and at least one gas discharge orifice that is connected to the outside of the gas adsorption body, and a groove section is formed that is connected to the gas inflow orifice and the gas discharge orifice.

14 Claims, 5 Drawing Sheets

GAS ADSORBENT FILTER

BACKGROUND OF THE INVENTION

1. Field of the Invention

The present invention relates to a gas adsorption filter that is provided at the breather hole for the pressure regulation of a semi airtight container that requires pressure regulation and has means for the elimination of chemical contaminants which enter through the breather hole.

2. Description of Related Art

Magnetic storage disk systems are extremely susceptible to chemical contamination. High molecular weight organic vapors are absorbed by the extremely smooth surfaces of the disk and the slider and, in addition, the characteristics of the fluid lubricants change. Other chemical contamination, for example, by $SO_2$, causes the corrosion of the disk and head alloys and, especially, of magnetoresistive read-out elements. Previously, magnetic storage disk systems were made in a completely hermetically sealed form in order to prevent the entry of this kind of corrosive gas from outside. However, with the progressing changeover at the present time to stainless steel press molded plates for the top cover, the volume change distortion of completely hermetically sealed types due to temperature changes is great, producing problems such as head crashes, case deformation, and the like and it has become common to provide a breather hole so as to carry out pressure regulation. In addition, in order to prevent the entry of minute particles and the influx of corrosive gases, gas adsorption breather filters are often used that have a gas adsorbing agent and a particle filter combined in a single unit. With this filter, the entire breather hole is covered with an active carbon sheet or the like and the harmful gases that seek to enter are eliminated by passing the gases through the interior of the gas adsorbent material layer.

However, since air passes through the filter, nonwoven cloth type sheets, porous sheets, and the like having low permeability resistance are demanded. As a measure in response to that, schemes to reduce the permeability resistance such as decreasing the density and weight per unit area of the nonwoven cloth or increasing porosity have been employed. However, the resulting dilemma that is faced is that the packing density of the gas adsorbing agent is reduced and the adsorption effectiveness is lowered. Currently, in general, in contrast to breather filters that are not provided with a gas adsorbing agent, a tenfold pressure loss for gas adsorbent material sheets is common.

With the gas adsorption breather filter, a low pressure loss is demanded. In those cases where there is a high pressure loss, it is not possible for air to pass through to obtain satisfactory moderation with regard to the pressure changes in the magnetic storage disk system that accompany temperature changes when the system is turned on and off and with the high-speed rotation of the spindle motor. With this, air enters through those places where the sealing is weak rather than through the breather hole, bringing about an influx of contaminants. Because of this, an active carbon sheet such as an active carbon fiber woven fabric like Kynol is widely used for the gas adsorption breather filter. However, in the case of this woven fabric, the pressure loss is naturally low but the active carbon density per unit volume is low at 0.26 g/cc.

Incidentally, together with the currently increasing storage capacity of magnetic storage disk systems, their utilization environment is worsening due to a transition to higher rotation speeds and the spread of mobile type personal computer use and an increase in the amount of the activated carbon of the breather hole is desirable. In addition, because of the improvements that accompany higher hard disk drive (HDD) performance, the read heads of the HDD have come to be vulnerable with respect to contamination. Due to a transition to higher performance devices and use in environments other than a well-kept office environment, there has come to be a demand for not only the control of the influx of corrosive gases through the breather hole, but for much more stringent control of the gases and moisture generated by the motor and the like in the HDD. Because of this, there is always a demand that the amount of activated carbon that is enclosed in the filter be increased as much as possible.

However, when the amount of activated carbon is increased, the pressure loss for the filter increases and leakage problems such as those described before and the like are produced. Therefore, HDD manufacturers always are faced with the dilemma of the difficulty of achieving both the demanded reduction of filter pressure losses and the demanded increase in the amount of activated carbon at the same time.

A method has been proposed to resolve at one time the demand for an increase in the amount of activated carbon and the demand to reduce pressure losses as a method to resolve this dilemma (Japanese Laid-Open Patent Application Publication (Kokai) Number 2000-70649). With this, the contaminants are eliminated from the air that flows into a semi airtight container by having the air flow through the adsorbent material surface that is formed in the flow path and, since the air passes through a flow path having a low resistance, it is possible to keep the pressure loss low.

Incidentally, recently for HDDs, there has been an increasing demand for the rapid damping of pressure changes within the HDD, in other words, for breather filters with an extremely low resistance (pressure loss). The improvement of the damping performance of the breather filter is possible by relaxing the stringent specifications of the seal material. That is to say, if the pressure damping capability of the breather hole is satisfactorily increased even when the seal performance is low, the problem in which air flows other than through the breather hole does not occur. In addition, this makes it possible to relax the sealing specifications of not only the packing that fixes and seals the top cover but also the connector section for bringing in the electric power, inputting and outputting data and the like, as well as the portion for anchoring the motor and the like. By this means, it becomes permissible to use low-cost seal materials and, in addition, the simplification of the assembly process is possible. The result is that this makes a great contribution to reducing the total cost of the HDD.

In addition, the molding of the gas adsorbing agent as a protuberance which is formed in the space where the fluid that moves between the airtight container and the outside flows has been proposed as an improved plan (Japanese Laid-Open Patent Application Publication (Kokai) Number 2000-107543). This is done because the adsorbent material becomes a hindrance to the flow of the fluid and, as a result, the pressure drop is increased at the time of passing through the filter.

The methods that have been proposed here have as their aim solely the reduction of pressure losses by the filter and are proposed as measures to counteract that. However, two problems can be anticipated with these two methods.

(1) When the pressure loss becomes small, the air that is flowing through will quickly pass through the filter. In this case, the corrosive gases that are flowing through are not able to have satisfactory contact with the adsorbing agent and flow into the semi airtight container with a portion not adsorbed by the adsorbing agent. In other words, the corrosive gases that flow in without being captured adhere to the heads and media and there is a possibility that eventually the device will lapse into functional disorder. In other words, with these methods, the pressure loss is reduced but the measures they employ regarding gas adsorption performance are not satisfactory.

(2) These methods are effective in those cases where the influx of the air that flows through is from the center of the filter. However, in those cases where the breather hole is not in the center, in the same manner as in (1), as is to be expected, the air that flows through passes through the shortest distance and flows into the enclosure without being fully cleansed by the adsorbing agent.

These problems occur only in the space that is formed in which the air flows and are due to the fact that the direction and flow of the in flowing air are not controlled.

In general, an expansion of the air flow path and an enlargement of the opening section is demanded in order to reduce the pressure loss. However, in doing this, the harmful gases that flow into the HDD from outside cannot be fully absorbed, and the gas trapping capability is degraded to the degree that the pressure loss is reduced. As expected, the same kinds of problems as those described above are of concern.

These and other limitations are sought to be overcome by the present invention.

SUMMARY OF THE INVENTION

The present invention has as its benefit the provision of a gas adsorption filter that does not demand the modification of the HDD case, moreover, does not require plastic parts that lead to increased costs, and moreover, while having an adsorption ability that is equal to or better than filters of the past, is able to achieve an even lower pressure loss.

The present inventors, as a result of repeated diligent research aimed at solving the previously mentioned problems, arrived at the consummation of the present invention.

In accordance with the present invention, the gas adsorption filters shown herein are provided.

In one embodiment, there is provided a gas adsorption filter that is attached within a semi airtight container such that it covers the breather hole for regulating the pressure of said container and which has the function of capturing harmful gases that flow into said container passing through said breather hole. The gas adsorption filter is characterized in that said filter has an opening that is connected with and open to said breather hole and, moreover, comprises a base material having an attachment surface for attaching the filter to the inner wall of said container. A gas adsorption body is laminated and fixed to the gas flow path surface on the side opposite to that of said attachment surface of said base material, and on the gas contact surface on the side where said gas adsorption body is in contact with the gas flow path surface of said base material, there is at least one gas inflow orifice that is connected with and open to the opening of said base material. At least one gas discharge orifice is connected with an open to the outside of said gas adsorption body, and a groove section is formed that is connected with and open to said gas inflow orifice and said gas discharge orifice. Preferably, the groove width of said groove section is 10 mm or less, the proportion of the overall area of said groove section is 10 to 97%, and, in addition, the degree of nonuniform distribution of said groove section is ±70% or less.

DESCRIPTION OF THE DRAWINGS

The operation of the present invention should become apparent from the following description when considered in conjunction with the accompanying drawings, in which.

DETAILED DESCRIPTION OF THE INVENTION

The gas adsorption filter of the present invention includes a base material that has openings for the influx and discharge of the gas. On one of the surfaces of the base material, an attachment surface is formed for the attachment of the gas adsorption filter to the inner wall surface of the container and on the other surface, a support body surface is formed for the laminating and fixing of the gas adsorption body and, together with this, a gas flow path surface is formed for the contact and flowthrough of the gas.

The base material comprises a material in sheet form. As examples of this kind of sheet material that can given, there are various kinds that have been publicly known for some time such as, for example, sheets of synthetic resins such as polyethylene, polypropylene, nylon, polyester, polyvinyl acetate, polycarbonate, and the like, nonwoven cloth, nonwoven cloth impregnated with an acrylic group adhesive, metal sheets (stainless steel and the like), and metal foil/synthetic resin sheet laminates and the like. With regard to the thickness, there is no particular restriction, but it is preferably 10 to 2,000 μm, and 25 to 200 μm is most preferable. With regard to the shape of the base sheet material, in general, a flat sheet shape overall is preferable but it may also have a structure in which a portion or all of the peripheral edge is raised (box type), and any shape may be employed as long as it is one that is suitable for supporting and anchoring the gas adsorption body.

An opening for gas influx and discharge are located in the base material. This opening is connected with and open to the breather hole for pressure regulation of the semi airtight container (hereafter, simply referred to as the "container"), which is the object for the attachment of the gas adsorption filter, and the gas that flows in through the breather hole passes through the opening and comes into contact with the gas adsorption body.

The opening can be either a single one or a plurality and its size is not particularly restricted as long as the dimensions allow it to be connected with and open to the previously mentioned breather hole. Preferably, the dimensions are 0.1 to 10 times the dimensions of the breather hole, and 2 to 4 times is most preferable.

The gas adsorption filter of the present invention is attached to the inner wall of the container through the base material. There are no particular restrictions regarding the attachment method, but usually, the material is attached through an adhesive or a bonding agent. That is to say, for the attachment of the gas adsorption filter to the inner wall of the container, there are no restrictions as long as the attachment surface, which is one surface of the base material, is laminated and fixed to the inner wall surface of the container with the interposition of an adhesive layer or a bonding agent layer such that the breather hole is covered.

The gas adsorption body is laminated and fixed to the gas flow path surface of the previously mentioned base material, which is the side that is opposite to that of the gas adsorption filter attachment surface. There are no particular restrictions regarding the fixing method, but usually, the item is fixed through an adhesive or a bonding agent. That is to say, for fixing the gas adsorption body to the gas flow path surface of the base material, there are no restrictions as long as the gas adsorption body is fixed with the interposition of an adhesive layer or a bonding agent layer.

Various kinds of conventional materials may be employed as the adhesive or bonding agent. Examples that can be given of adhesives include, for example, pressure sensitive acrylic group adhesives, butyl rubber group adhesives, polystyrene group adhesives and the like. Examples that can be given of bonding agents include, for example, epoxy group bonding agents, hot melt group bonding agents, and the like.

In the present invention two-sided adhesive sheets can be preferentially used as the base material. In addition, non-woven cloth impregnated with an acrylic group adhesive possesses adhesive properties on both surfaces and can be preferentially used in the same manner as two-sided adhesive tape. By means of the use of this kind of base material having adhesive properties on both sides, the anchoring of the base material to the inner wall surface of the container is simple and, in addition, the fixing of the gas adsorption body to the gas flow path surface of the base material is also easy.

The gas adsorption filter of the present invention includes a gas adsorption body. The gas adsorption body is in contact with the gas that flows into the container through the container breather hole and has the function of adsorbing the harmful gases (for example, $SO_x$, $NO_x$, organic gases, moisture and the like) that are in that gas. The gas adsorption body contains a gas adsorbing agent. There are no particular restrictions regarding the gas adsorbing agent and various kinds of conventional publicly known types can be used singly or in mixtures including those such as activated carbon, silica gel, activated alumina, zeolite, various kinds of clay, iron oxide, magnesium percarbonate, ion exchanging resin, and the like. The average particle diameter of the gas adsorbing agent is preferably 0.01 to 5,000 μm and 1 to 500 μm is most preferable.

The gas adsorption body can be in various kinds of shapes with the surface for contact with the gas formed as a flat surface. For example, the shape can be a sheet shape, a block shape, etc. In those cases where a block shaped gas adsorption body is employed, it is preferable that a box type base material having raised peripheral edges be used as the base material on which the block is supported and fixed.

The gas adsorption body that is used in the present invention can be obtained in accordance with conventional publicly known methods in which the item is molded with a powdered gas adsorbing agent in the presence of a binder resin. With regard to the molding method, various kinds of thermal molding methods can be utilized including extrusion molding methods, injection molding methods, calendar molding methods, and the like.

Various kinds of thermoplastic resins can be used for the binder resin. These include in addition to, for example, fluorine resins containing polytetrafluoroethylene, polyvinylidene fluoride, and the like, polyolefin group resins such as polypropylene, polyethylene, and the like, and polyester group resins such as poly(ethylene terephthalate) and the like, polyvinyl alcohol and various kinds of nylon and the like. With regard to the proportion of binder resin, the proportion should be 0.1 to 100 parts by weight for 100 parts by weight of gas adsorbing agent, and 5 to 30 parts by weight is preferable.

The thickness of the gas adsorption body is preferably 0.1 to 10 mm and 0.5 to 3 mm is most preferable. In the case of the present invention, the gas adsorption body is preferably made circular or rectangular (a quadrilateral shape). A richly porous structure is preferable for the gas adsorption body that is used in the present invention. This kind of material can be obtained by the extrusion and rolling (drawing) into a sheet form of a kneaded melted mixture of a powdered gas adsorbing agent and a binder resin.

The manufacturing method for the gas adsorption body that is used in the present invention is discussed in detail in, for example, Japanese Laid-Open Patent Application Publication (Kokai) Number 4-323007.

The gas adsorption filter of the present invention is characterized in that the filter has a gas inflow orifice and a gas discharge orifice as well as a groove section that is connected with and open to the gas inflow orifice and the gas discharge orifice on the surface on the side of contact with the gas flow path surface of the base material (the gas contact surface).

The previously mentioned gas inflow orifice is connected with and open to the opening that has been formed in the base material and, moreover, is connected with and open to the gas discharge orifice that has been formed in the base material. The orifice serves as the entryway for the introduction of the gas (air) that flows in through the opening to the groove section that has been formed on the gas adsorption body surface. The gas inflow orifice usually comprises the end opening of the groove on the side that connects with and opens to the base material opening for the groove section that connects with and opens to the gas discharge orifice that is formed on the gas contact surface of the gas adsorption body. The number of gas inflow orifices is one or more, with three or more being preferable and four or more even more preferable. There are no particular restrictions with regard to the upper limit figure, but it is usually around 20.

The previously mentioned gas discharge orifice is formed in the peripheral edge area of the gas contact surface of the gas adsorption body and serves as the exit with which the gas that flows in through the previously mentioned gas inflow orifice and flows through the groove section that has been formed on the gas adsorption body surface is discharged outside the gas adsorption body. The discharge orifice usually comprises the end opening of the groove on the side that connects with and opens to the outside for the groove section that connects with and opens to the gas inflow orifice that is formed on the gas flow path surface of the gas adsorption body. The number of gas discharge orifices is one or more with three or more being preferable, four or more being more preferable, and five or more even more preferable. There are no particular restrictions with regard to the upper limit figure, but it is usually around 30.

The previously mentioned groove section connects with and opens to the previously mentioned gas inflow orifice and gas discharge orifice and forms the gas flow path.

In the present invention, the depth of the groove section that is formed on the bottom surface of the gas adsorption body (the contact surface of the base material), although this also depends on the thickness of the gas adsorption body, is usually 0.01 to 5 mm and 0.25 to 2 mm is preferable. The groove width is also dependent on the area of the gas contact surface of the gas adsorption body, but is usually 10 mm or less. In the case where the semi airtight container in which the gas adsorption body is used is a small sized container such as for a magnetic storage disk system, the groove depth is 5 mm or less, and preferably 2 mm or less. There are no particular restrictions with regard to the lower limit value, but usually it is around 0.1 mm. In addition, the percentage of the area for the entire groove section that is formed on the bottom surface of the gas adsorption body is 10 to 97%, with 30 to 90% being preferable and 70 to 90% even more preferable.

Incidentally, the percentage of the area for the entire groove section in this specification is defined in accordance with the following equation.

$$R = A/B \times 100$$

R: percentage of the area for the entire groove section (%)
A: area of the entire groove section
B: area of the bottom surface of the gas adsorption body It is preferable that the groove section that is formed on the bottom surface of the gas adsorption body in the present invention be distributed uniformly over the bottom surface of the gas adsorption body. In the case of the present invention, the degree of distribution nonuniformity D for the groove section that is formed on the bottom surface of the gas adsorption body is stipulated at 70% or less, with 50% or less being preferable and 10% or less even more preferable.

Incidentally, when the bottom surface of the gas adsorption body is divided into four arbitrary sectors, $P^1$ through $P^4$, having equal areas S and the groove section area percentages, $R^1$ through $R^4$, are derived for each of the sectors $P^1$ through $P^4$, the previously mentioned degree of groove section distribution nonuniformity D is defined as the greatest difference between any two of the area percentages from among the groove section area percentages $R^1$ through $R^4$ ($R^n - R^m$; n and m are numbers from 1 to 4; however, it should be noted that n>m).

In addition, the groove area percentages $R^1$ through $R^4$ (%) for each of the sectors $P^1$ through $P^4$ are expressed by the following equations.

$$R^1 = A^1/S \times 100$$

$$R^2 = A^2/S \times 100$$

$$R^3 = A^3/S \times 100$$

$$R^4 = A^4/S \times 100$$

In the previously mentioned equations, $A^1$ indicates the area of the groove section for the sector $P^1$, $A^2$ indicates the area of the groove section for the sector $P^2$, $A^3$ indicates the area of the groove section for the sector $P^3$, and $A^4$ indicates the area of the groove section for the sector $P^4$. S indicates the area of the sector division when the bottom surface of the gas adsorption body has been divided equally into four parts.

In showing specific configurations of the groove section that is formed on the bottom surface of the gas adsorption body, the following can be presented.

(1) Helical Shaped Groove

For the helical shape in this case, a helix also implies one that comprises a crooked line or an indented line in addition to one that comprises a curved line.

The gas flow path that has a helical shaped groove includes those such as (a) a gas flow path that comprises one gas inflow orifice, one gas discharge orifice, and one helical shaped groove that is connected between the gas inflow orifice and the gas discharge orifice and open to them and (b), with the gas flow path of (a), the gas flow path has grooves branch from 1 to 10 points and, preferably, from 2 to 8 points, and the like.

(2) Lattice Shaped Groove

This groove means a groove having a plurality of linear grooves formed in the vertical direction and a plurality of linear grooves formed in the horizontal direction with those grooves intersecting. In this case, linear grooves also imply curved grooves in addition to straight line grooves.

(3) Radiating Shaped Grooves

This groove means linear grooves that have the gas inflow orifice as a starting point and extend from there in a radial direction. In this case, linear grooves also imply curved grooves in addition to straight line grooves. With the radiating shaped grooves, all of the linear grooves that extend in the radial direction may be connected by intersecting the grooves.

In the present invention, it is preferable that there be four or more gas discharge orifices formed on the bottom surface of the gas adsorption body and, in addition, that all of these gas discharge orifices be connected with and opened to at least one groove section.

By means of a configuration such as this, it is possible to maintain a low gas pressure loss when the gas enters through the gas inflow orifice, passes through the groove section and is discharged to the outside through the discharge orifice without degrading the elimination rate for harmful gases by the gas adsorption body.

Examples of the forms of the groove sections that are formed on the bottom surface of the gas adsorption body in the present invention are shown in FIG. 1 through FIG. 6.

Figure 1:
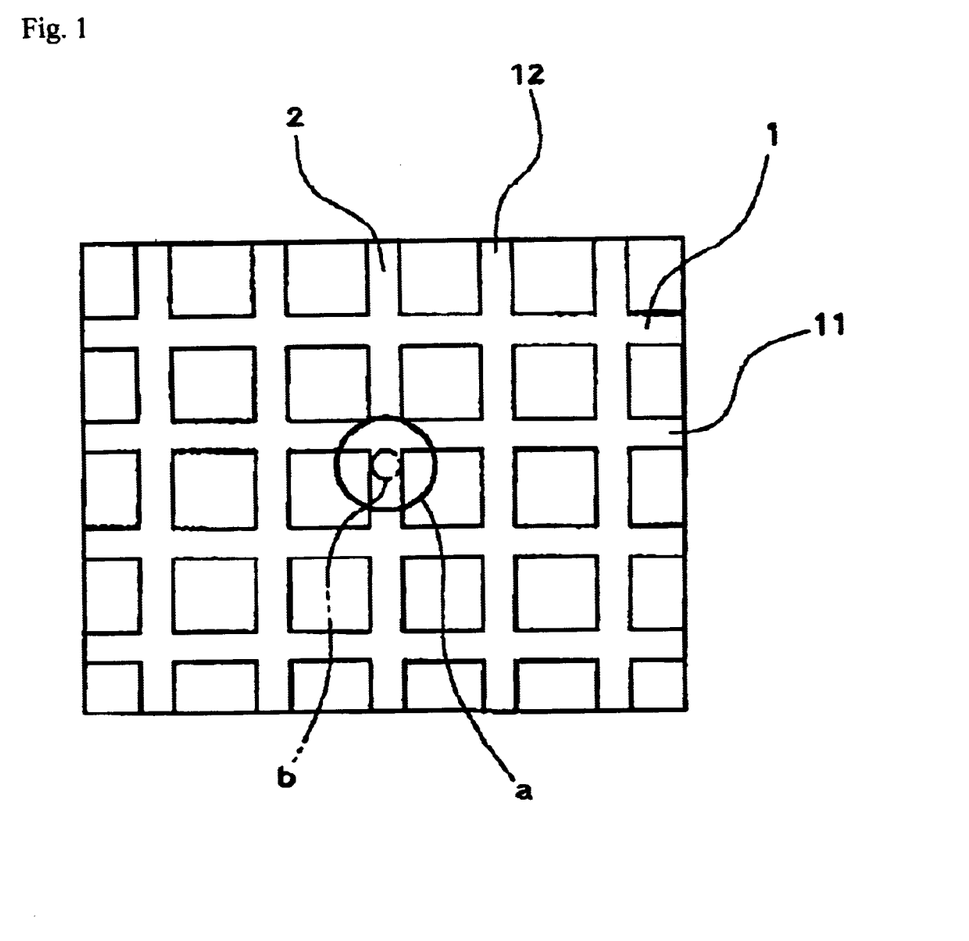
FIG. 1 shows one example of the shape of the groove section that is formed on the bottom surface of the gas adsorption body.

The groove section that has been shown in FIG. 1 has a lattice shape on the bottom surface of a four-sided gas adsorption body with the plurality of linear groove sections 1, which extend in the horizontal direction, and the plurality of linear groove sections 2, which extend in the vertical direction, that intersect. In this case, the opening a that has been formed in the base material is positioned in the center of the bottom surface of the gas adsorption body and is arranged in a position where the body is connected with and open to the breather hole b of the container wall.

In the gas flow path that comprises the gas inflow orifice, the gas discharge orifice and the groove section that connects with and opens to the gas inflow orifice and the gas discharge orifice that has been shown in FIG. 1, the opening portion of each of the grooves that are positioned in the peripheral edge area of the bottom surface of the gas adsorption body, connecting and open to the outside, form the gas discharge orifices 11 and 12 and are 18 in number. On the other hand, the openings of each of the grooves that are in the location where they are connected with and open to the opening a of the base material form the gas inflow orifice and are four in number.

Figure 2:
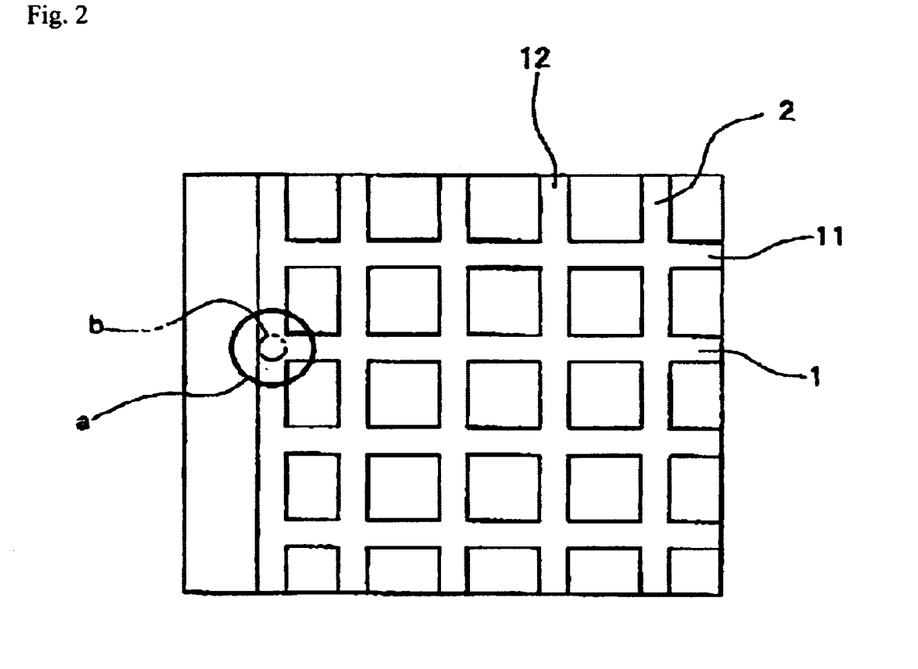
FIG. 2 shows another example of the shape of the groove section that is formed on the bottom surface of the gas adsorption body.

The groove section that has been shown in FIG. 2 has a lattice form in which the plurality of linear groove sections 1, which extend in the horizontal direction, and the plurality of linear groove sections 2, which extend in the vertical direction, intersect on the bottom surface of a four-sided gas adsorption body. In this case, the opening a that has been formed in the base material is positioned in the vicinity of the peripheral edge of the bottom surface of the gas adsorption body and arranged in a location connected with and open to the breather hole b in the container wall.

In the gas flow path that comprises the gas inflow orifice, the gas discharge orifice and the groove section that connects with and opens to the gas inflow orifice and the gas discharge orifice that has been shown in FIG. 2, the opening portion of each of the grooves that are positioned in the peripheral edge area of the bottom surface of the gas adsorption body, connecting and open to the outside, form the gas discharge orifices 11 and 12 and are 14 in number. On the other hand, the openings of each of the grooves that are in the location where they are connected with and open to the opening a of the base material form the gas inflow orifice and are three in number.

Figure 3:
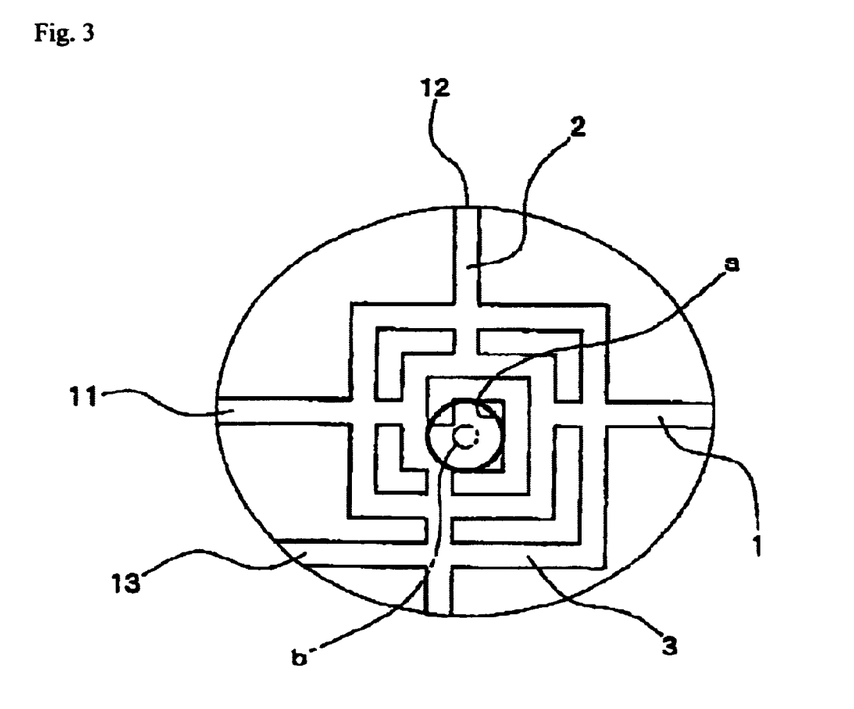
FIG. 3 shows one more example of the shape of the groove section that is formed on the bottom surface of the gas adsorption body.

The groove section that has been shown in FIG. 3 has the helical shaped groove section 3 formed on the bottom surface of a circular gas adsorption body with the grooves 1, which extend in the horizontal direction, and the grooves 2, which extend in the vertical direction, formed branching from the helical shaped groove section 3. The helical shape in this case is formed by straight line groove sections but curved groove sections may also be used.

In FIG. 3, there is one gas inflow orifice that connects with and opens to the opening a of the base material and a total of five (11, 11, 12, 12, and 13) gas discharge orifices that connect with and open to the outside.

Figure 4:
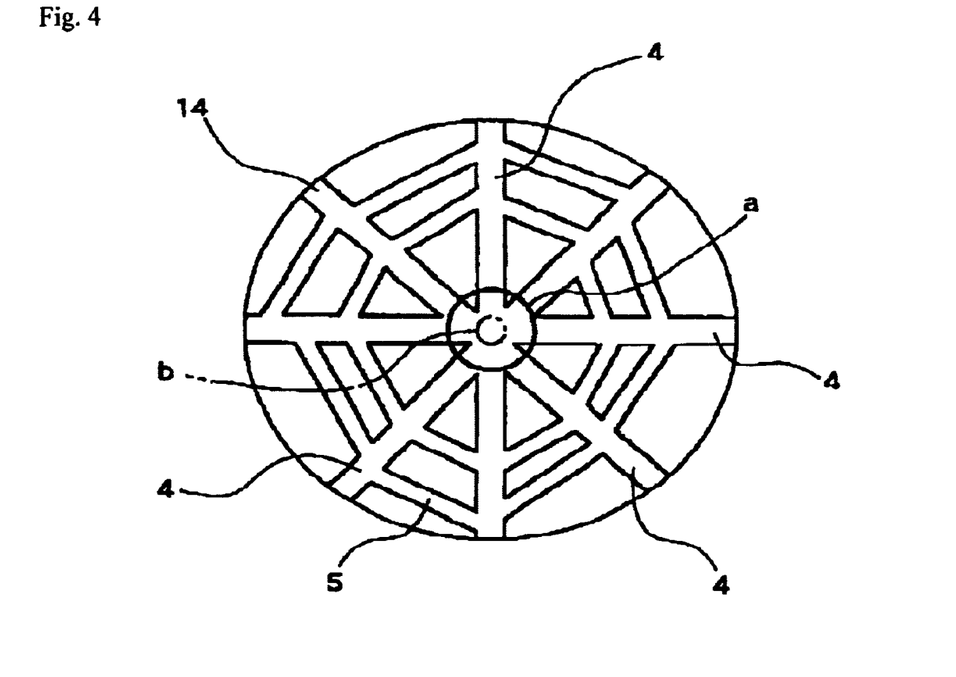
FIG. 4 shows one more example of the shape of the groove section that is formed on the bottom surface of the gas adsorption body.

The groove section that has been shown in FIG. 4 has the radiating shaped groove sections 4 formed on the bottom surface of a circular gas adsorption body with the connecting grooves 5, which intersect with the groove sections 4, formed to connect with and open to the groove sections 4.

In FIG. 4, the gas inflow orifices that connect and open to the opening a of the base material number eight and there are 8 gas discharge orifices 14 that connect with and open to the outside.

Figure 5:
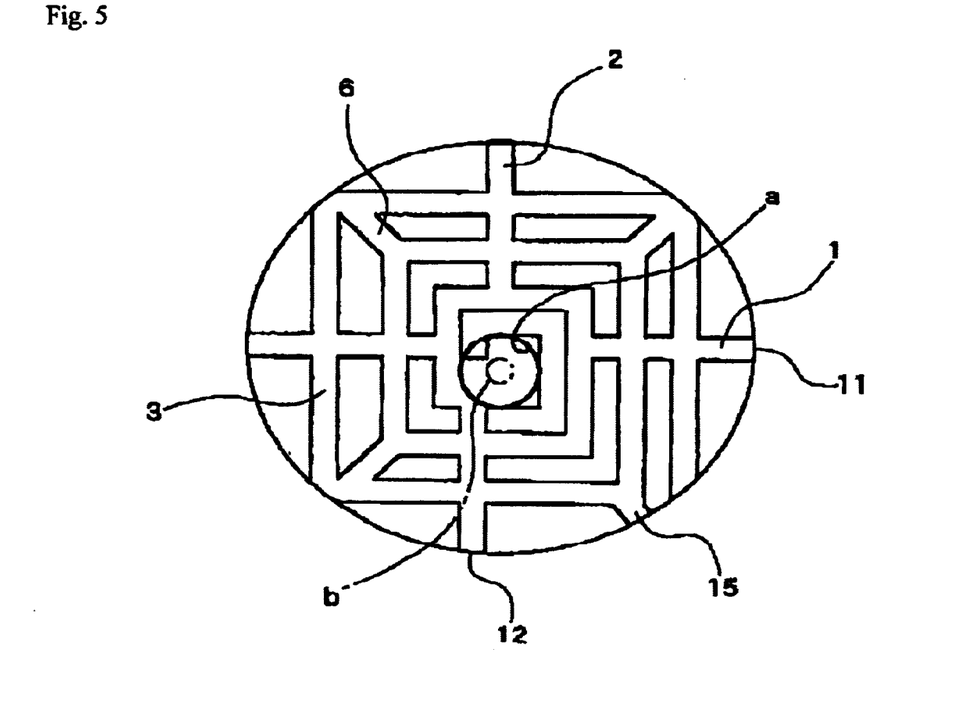
FIG. 5 shows one more example of the shape of the groove section that is formed on the bottom surface of the gas adsorption body.

The groove section that has been shown in FIG. 5 has the helical shaped groove section 3 formed on the bottom surface of a circular gas adsorption body with the grooves 1, which extend in the horizontal direction, and the grooves 2, which extend in the vertical direction, formed branching from the helical shaped groove section 3 and, in addition, the connecting grooves 6 formed to connect with and open to the outer grooves and the inner grooves of the helix.

In FIG. 5, there is one gas inflow orifice that connects with and opens to the opening a of the base material and a total of 15 gas discharge orifices 11, 12 and 15 that connect with and open to the outside.

Figure 6:
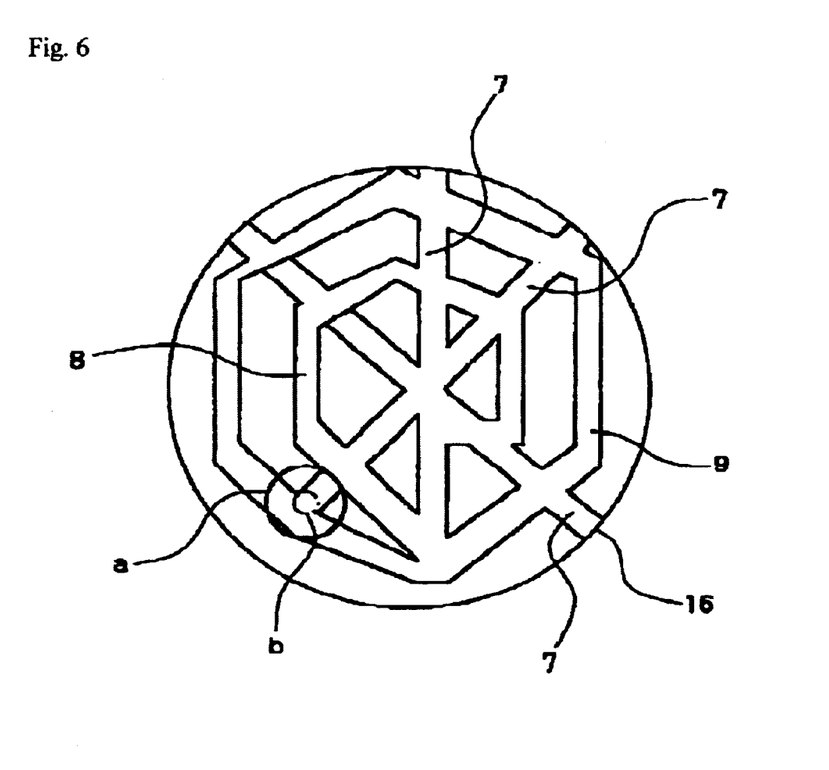
FIG. 6 shows one more example of the shape of the groove section that is formed on the bottom surface of the gas adsorption body.

The groove section that has been shown in FIG. 6 has the groove sections 7, 8, and 9 formed unordered on the bottom surface of a circular gas adsorption body.

In FIG. 6, the gas inflow orifices that connect with and open to the opening a of the base material are positioned in the vicinity of the peripheral edge of the bottom surface of the gas adsorption body and number three. There are four gas discharge orifices 16 that connect with and open to the outside.

For the formation of the groove section on the bottom surface of the gas adsorption body, a press plate with a protruding portion (convex portion) that corresponds to the groove section can be used and the plate pressed onto the bottom surface of the gas adsorption body.

The outer surface of the gas adsorption body can be enveloped (covered) with a porous synthetic resin sheet. By this means, it is possible to capture harmful particles that enter the container from outside. In order to attach the porous sheet so that it envelops the outer surface of the gas adsorption body, the peripheral edge section of the porous sheet with which the gas adsorption body is enveloped can be laminated and bonded to the surface of the base material. The bonding methods in this case encompass thermal fusion in addition to methods that employ adhesives and bonding agents.

Examples of porous synthetic resin sheets include porous sheets made from synthetic resins including various kinds of conventional publicly known types such as, for example, polytetrafluoroethylene, polyethylene, polypropylene, polyester, polyvinylidene fluoride, and the like. In the case of the present invention, since porous polytetrafluoroethylene sheet is superior from the standpoint of not producing dirt and not generating gas, it can be used preferentially.

The thickness of the porous synthetic resin sheet is 1 to 1,000 $\mu$m and 10 to 100 $\mu$m is preferable. The average hole diameter is 0.005 to 50 $\mu$m and 0.01 to 1 $\mu$m is preferable. The void volume is 20 to 99% and 70 to 90% is preferable.

It is preferable that a gas permeable sheet be laminated to the upper surface and/or the lower surface (bottom surface) of the gas adsorption body that is used in the present invention in order to prevent the loss of the gas adsorbing agent from the gas adsorption body. By laminating a gas permeable sheet on both the upper surface and the lower surface of the gas adsorption body, it is possible to obtain a gas adsorption body with which the loss of the gas adsorbing agent from the gas adsorption body is prevented and that has excellent handling properties.

Various kinds of conventional publicly known types can be used for the gas permeable sheet such as, for example, the previously mentioned porous synthetic resin sheets. The thickness of the sheet is 1 to 100 $\mu$m and 5 to 20 $\mu$m is preferable.

In order to laminate the gas permeable sheet to the upper surface and/or the lower surface of the gas adsorption body, the gas permeable sheet may be superimposed on the upper surface and/or the lower surface of the gas adsorption body and bonded or crimped. In the case of bonding, it is preferable that a partial bonding method be employed such that the bonding surface lamination proportion be 5 to 90% and preferably 10 to 30% in order that contact between the gas adsorption body and the gas be done smoothly.

It is preferable that the formation of the groove section on the bottom surface of the gas adsorption body be carried out with the interposition of the gas permeable sheet.

In the present invention, the opening in the base material can be covered with a gas permeable sheet in order to prevent the entry of harmful particles into the container from outside. In this case, various kinds of conventional publicly known types can be used for the gas permeable sheet such as, for example, the previously mentioned porous synthetic resin sheets.

In order to cover the opening in the base material with a gas permeable sheet, the gas permeable sheet may be laminated and bonded on the opening in the base material.

Next, the gas adsorption filter of the present invention will be discussed in detail while referring to the drawings.

Figure 7:
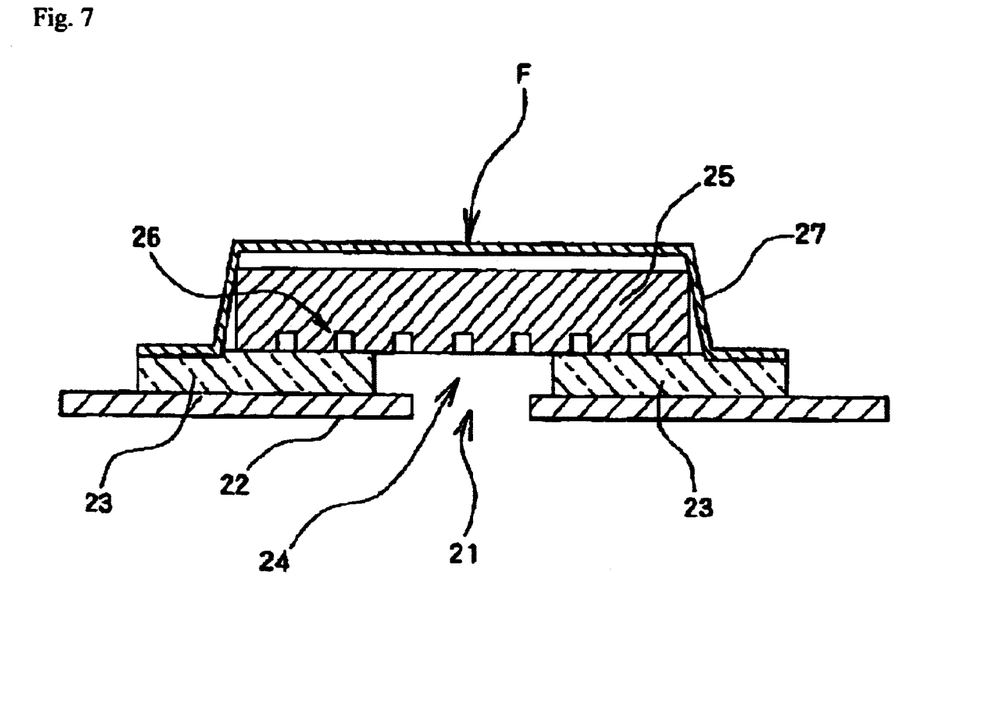
FIG. 7 is an explanatory cross-section drawing of the gas adsorption filter of the present invention.

FIG. 7 is an explanatory cross-section drawing of the gas adsorption filter of the present invention.

In FIG. 7, 21 indicates the breather hole of a container, 22 indicates the wall (cover) of a semi airtight container, 23 indicates the base material (two-sided adhesive tape), 24 indicates an opening (die cut hole), 25 indicates the gas adsorption body (gas adsorption sheet), and 26 indicates the groove section (gas flow path). F indicates the gas adsorption filter.

Figure 8:
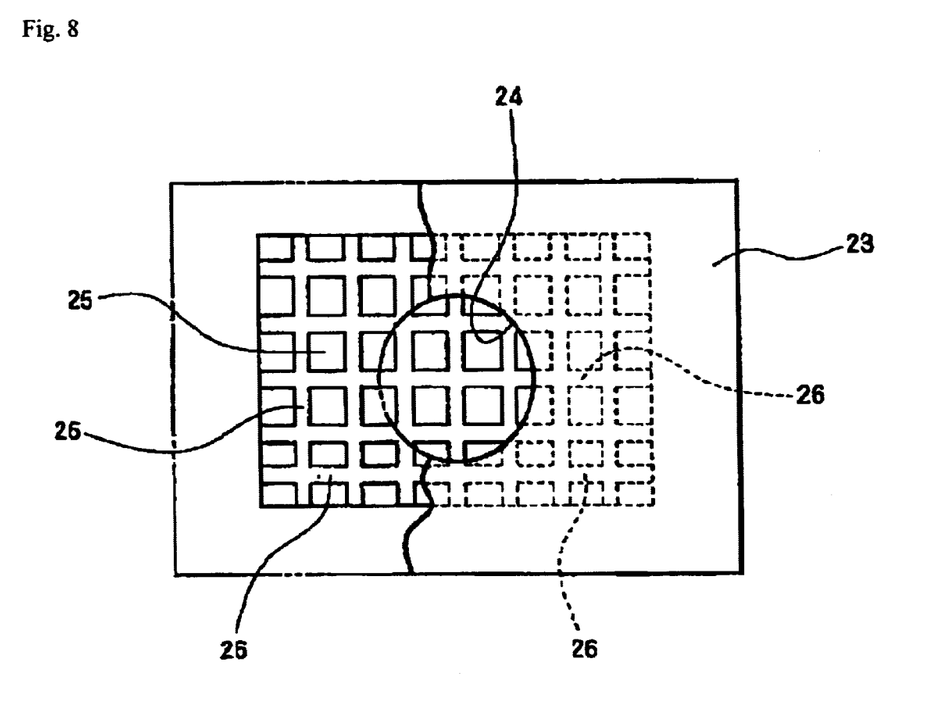
FIG. 8 shows the shape of the groove section that is formed on the bottom surface of the gas adsorption sheet in the gas adsorption filter that is shown in FIG. 7.

FIG. 8 is an explanatory plane drawing of the bottom surface (lower surface) of the gas adsorption sheet that is shown in FIG. 7. In FIG. 8, 25 indicates the gas adsorption sheet and 26 indicates the groove sections.

The structure of the gas adsorption filter shown in FIG. 7 comprises the gas adsorption sheet 25 having the groove sections 26 formed on the bottom surface (the gas contact surface), which is laminated and fixed on one surface (the gas flow path surface) of the adhesive tape 23 and the outer surface of the gas adsorption sheet is covered with the porous sheet 27. In this case, the groove sections that are formed on the bottom surface of the gas adsorption sheet 25 have a lattice shape such as that shown in FIG. 8.

The laminating and fixing of the gas adsorption sheet 25 to the adhesive tape 23 is carried out with an adhesive layer that has been formed on the adhesive tape surface and bonding is done between the flat surface of the gas adsorption sheet 25 other than the groove sections and the adhesive surface of the adhesive tape 23.

The surface of the side that is the opposite side to that of the gas flow path surface of the gas adsorption sheet 25 (the attachment surface) is bonded to the inner wall surface 22 of the container cover and the gas adsorption sheet 25 is arranged by this means on the surface of the container inner wall.

The opening 24 that connects with and is open to the breather hole 22 of the container is formed in the center of the adhesive tape 23.

The porous sheet 27 is used to prevent the entry of dust produced from the gas adsorption sheet 25 and particles from outside and the like into the interior of the container.

The gas adsorption filter F has the function of adsorbing and removing the harmful gases in the gas (air) that flows into the interior of the container through the breather hole 21 of the container.

In other words, the gas that enters the interior of the container through the breather hole 21 first enters the opening 24 that has been formed in the adhesive tape 23 and, from there, passes through the mouth of the groove (the gas inflow orifice) that connects with and is open to the opening and enters the groove section 26. The gas flows and passes vertically and horizontally through the groove sections and is discharged to the outside through the openings (the gas discharge orifices) that are located on the peripheral edge area of the gas adsorption sheet and connect with and open to the outside.

In the gas adsorption filter F that has been shown in FIG. 7, the mouths (the gas inflow orifices) of the grooves that connect with and open to the opening (the base material opening) that has been formed in the adhesive tape 23 number 12 and the number of groove openings (gas discharge orifices) that connect with and open to the outside is 20.

The groove sections that have been formed in the bottom surface of the gas adsorption sheet 25 (the surface that is in contact with the adhesive street) are distributed uniformly over the entire bottom surface and, in addition, since the area percentage of the groove sections overall is high, when the gas that enters through the gas inflow orifices flows along the bottom surface of the adsorption sheet and is discharged to the outside, the pressure loss is low. Moreover, since the contact between the gas and the gas adsorption sheet is sufficient, the harmful gases that are contained in the gas are effectively adsorbed and removed by the adsorption sheet.

The gas adsorption filter of the present invention, is applicable to a semi airtight container with which the penetration of harmful gases is not desirable. In this case, the meaning of a "semi airtight container" is a container having a small diameter through hole (a breather hole) that is connected with and opens to the outside of the container. The size of the breather hole depends on the size and application of the semi airtight container but, in general, the area of the hole is preferably in the range of 0.1 to 2,000 mm$^2$ and 1 to 100 mm$^2$ is most preferable.

In addition, the meaning of the previously mentioned container is a housing having a gas space.

The devices that have the previously mentioned semi airtight container include hard disk drives (HDD), electronic component cover boxes for installation in automobiles and the like, carrier boxes for semiconductor wafers, magnetooptical drives, optical disk drives, and the like.

EXAMPLES

A more detailed description of the present invention will be given by means of the following non-limiting examples.

Example 1

A performance evaluation was carried out using a gas adsorption filter having the structure shown in FIG. 7. The details of the gas adsorption filter used in this exemplary embodiment are as follows.

(1) Base Material Sheet 23

A 4 mm diameter opening was formed in the center area of a 15 mm wide, 0.175 mm thick, and 17 mm long two-sided adhesive tape (manufactured by Sumitomo 3M; product name, "DCX903").

(2) Gas Adsorption Sheet 25

A mixture of 100 parts by weight of activated carbon powder with an average particle diameter of 10 $\mu$m and 30 parts by weight of polytetrafluoroethylene powder as the binder resin were melted and mixed, extruded and rolled in a sheet form. To both surfaces of the obtained rolled material (an activated carbon sheet, 11 mm high, 12 mm wide, 0.6 mm thick, and weighing 44 mg), a porous polytetrafluoroethylene film (5 $\mu$m average hole diameter and 50% vacancy rate) was laminated and crimped at room temperature.

(i) Character of the Groove Section

A press mold comprising a stainless steel plate having a lattice shaped protuberance on its surface was pressed into the bottom surface of the previously mentioned gas adsorption sheet (2) at a pressure of 10 kg/cm$^2$ and lattice shaped groove sections were formed.

| | |
|---|---|
| Groove shape: | 1.0 mm groove spacing lattice shape |
| Groove width: | 0.3 mm |
| Groove depth: | 0.3 mm |
| Overall groove area percentage R: | 27% |
| Groove section distribution degree of nonuniformity D: | 10% or less |

(3) Porous Resin Sheet 27

A drawn porous polytetrafluoroethylene sheet having a thickness of 100 $\mu$m, an average hole diameter of 1.0 $\mu$m and a vacancy rate of 90%.

The performance evaluation of the gas adsorption filter was carried out as follows. A sample gas was supplied to the filter through the opening 24 of the adhesive sheet 23 in the previously mentioned gas adsorption filter and, together with this, the sample gas that was evacuated from the gas adsorption filter was analyzed.

In this experiment, the pressure loss of the gas adsorption filter was 0.35 Kpa under sample gas supply volume conditions of 100 ml/min. In addition, air containing 0.5 μg/ml of trimethyl pentane was employed as the sample gas. As described above, the sample gas was supplied to the gas adsorption filter at a supply volume of 0.8 ml/min, the concentration of the trimethyl pentane in the gas that was evacuated from the filter was measured, the trimethyl pentane removal rate was derived and the filter performance was evaluated.

Incidentally, the previously mentioned trimethyl pentane removal rate W (%) is expressed by the following equation.

$$W=(A-B)/A\times 100(\%)$$

A: trimethyl pentane concentration in the sample gas prior to passing through the gas adsorption filter B: trimethyl pentane concentration in the sample gas after passing through the gas adsorption filter In the previously mentioned experiment, the trimethyl pentane removal rate was 100% seven minutes after the start of the experiment. The removal rate gradually dropped after seven minutes has passed and, nine minutes after the start of the experiment the trimethyl pentane removal rate had fallen to 98%

Comparative Example

The experiment was carried out in the same manner as in the experiment of Example 1 except that a groove section with one straight line groove having a width of 6 mm and a height of 0.3 mm (the overall groove area percentage was 50% and the degree of nonuniform distribution of the groove section was a maximum of 100%) was formed in the central area parallel to the short edge of the gas adsorption sheet 25.

In this experiment, the pressure loss of the sample gas was made 0.35 Kpa, the same as in Example 1. In this case, the trimethyl pentane removal rate was 100% 2.5 minutes from the start of the experiment but it gradually dropped after 2.5 minutes had passed and had fallen to 97% after five minutes from the start of the experiment.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. A gas adsorption filter that is attached within a semi airtight container such that it covers the breather hole for regulating the pressure of said container and which has the function of capturing harmful gases that flow into said container passing through said breather hole, the gas adsorption filter is characterized in that said filter has an opening that is connected with and open to said breather hole and comprises a base material having and attachment surface for attaching the filter to the inner wall of said container and a gas adsorption body that is laminated and fixed to the gas flow path surface on the side opposite to that of said attachment surface of said base material, and on the gas contact surface on the side where said gas adsorption body is in contact with the gas flow path surface of said base material, there is at least one gas inflow orifice that is connected with and open to an opening of said base material, and at least one gas discharge orifice that is connected with and open to the outside of said gas adsorption body, and a groove section is formed that is connected with and open to said gas inflow orifice and said gas discharge orifice, and the groove width of said groove section is 10 mm or less, the grooved proportion of the overall area of said groove section is 10 to 97%, and, in addition, the degree of nonuniform distribution of said groove section is 70% or less.

2. The gas adsorption filter cited in claim 1 in which the overall form of the groove section that is formed on the gas contact surface of said gas adsorption body is a lattice shape.

3. The gas adsorption filter of claim 1 in which the number of said gas inflow orifices is at least three.

4. The gas adsorption filter of claim 1 in which the number of gas discharge orifices is at least four.

5. The gas adsorption filter of claim 1 in which, among said groove sections, groove sections exist that are connected with and open to all of said gas discharge orifices.

6. The gas adsorption filter of claim 1 in which the lamination and fixing of said gas adsorption body to the gas flow path surface of said base material is carried out by means of an adhesive or a bonding agent.

7. The gas adsorption filter of claim 1 in which said base material is in a sheet form.

8. The gas adsorption filter of claim 1 in which said gas adsorption body is in a sheet form.

9. The gas adsorption filter of claim 1 in which the outer surface of said gas adsorption body is enveloped by a porous synthetic resin sheet.

10. The gas adsorption filter of claim 1 in which said gas adsorption body comprises a molded item that has been molded from a powdered gas adsorbing agent in the presence of a binder resin.

11. The gas adsorption filter of claim 10 in which said gas adsorbing agent comprises activated carbon and/or silica gel.

12. The gas adsorption filter of claim 10 in which said binder resin is at least one type selected from among polytetrafluoroethylene, polypropylene, polyethylene, polyvinylidene fluoride, polyvinyl alcohol, and polyethylene terephthalate.

13. The gas adsorption filter of claim 1 in which a gas permeable sheet is laminated to the gas contact surface of said gas adsorption body and/or to the surface of the opposite side.

14. The gas adsorption filter of claim 1 in which the opening of said base material is covered with a gas permeable sheet.

* * * * *